United States Patent
Imana et al.

(10) Patent No.: US 11,394,417 B1
(45) Date of Patent: Jul. 19, 2022

(54) HUMAN PROXIMITY SENSOR USING SHORT-RANGE RADAR

(71) Applicant: QUALCOMM Incorporated, San Diego, CA (US)

(72) Inventors: Eyosias Yoseph Imana, Chula Vista, CA (US); Roberto Rimini, San Diego, CA (US); Udara Fernando, San Diego, CA (US); Wing Han She, San Diego, CA (US); Anant Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/375,772

(22) Filed: Jul. 14, 2021

(51) Int. Cl.
| | |
|---|---|
| H04M 1/00 | (2006.01) |
| G01S 7/02 | (2006.01) |
| G01S 13/08 | (2006.01) |
| H04B 17/12 | (2015.01) |
| H04B 1/3827 | (2015.01) |
| H04W 52/24 | (2009.01) |
| H04B 5/00 | (2006.01) |

(52) U.S. Cl.
CPC ......... *H04B 1/3838* (2013.01); *H04B 5/0031* (2013.01); *H04B 5/0043* (2013.01); *H04B 5/0081* (2013.01)

(58) Field of Classification Search
None
See application file for complete search history.

(56) References Cited

U.S. PATENT DOCUMENTS

| | | | | |
|---|---|---|---|---|
| 8,798,695 | B1 * | 8/2014 | Zheng | H01Q 21/28 |
| | | | | 455/575.7 |
| 9,128,714 | B2 * | 9/2015 | Fortin | G06F 3/03543 |
| 9,191,055 | B2 * | 11/2015 | Lehmann | H04B 1/3838 |
| 9,769,769 | B2 * | 9/2017 | Harper | H04B 7/022 |
| 9,797,999 | B2 * | 10/2017 | Lee | G06F 3/0482 |
| 9,813,997 | B2 * | 11/2017 | Mercer | H04B 1/3838 |
| 10,135,295 | B2 * | 11/2018 | Leabman | H02J 50/60 |
| 10,727,888 | B2 * | 7/2020 | Fernando | G01S 13/878 |
| 10,871,549 | B2 * | 12/2020 | Rimini | G01S 13/08 |
| 10,897,318 | B2 * | 1/2021 | Rimini | H04W 52/367 |
| 10,924,145 | B2 * | 2/2021 | Mercer | H01P 1/38 |
| 10,942,264 | B2 * | 3/2021 | Sahin | G01S 13/878 |
| 10,972,145 | B1 * | 4/2021 | Klomsdorf | H01Q 21/28 |
| 11,047,952 | B2 * | 6/2021 | Zhang | G01S 13/343 |

(Continued)

*Primary Examiner* — Tuan A Tran
(74) *Attorney, Agent, or Firm* — Qualcomm Incorporated

(57) ABSTRACT

In an aspect, a user equipment (UE) determines a mutual coupling signal associated with a transmit antenna and a receive antenna, determines a mutual coupling difference between the mutual coupling signal and a reference signal, determines a beat signal difference between a current beat signal and a previous beat signal, and determines an amount of micro-motion that is present within a near field. The UE determines whether human tissue is present within the near field based on the mutual coupling difference and the amount of micro-motion. Based on determining that the human tissue is present within the near field, the UE determines an amount of radio frequency exposure associated with the human tissue. Based on determining that the amount of radio frequency exposure exceeds a maximum permissible exposure, the UE reduces the amount of radio frequency exposure associated with the human tissue.

30 Claims, 11 Drawing Sheets

(56) References Cited

U.S. PATENT DOCUMENTS

| | | | | |
|---|---|---|---|---|
| 11,146,343 | B2* | 10/2021 | Rimini | H04B 17/13 |
| 11,169,251 | B2* | 11/2021 | Sahin | G01S 13/32 |
| 11,194,031 | B2* | 12/2021 | Sahin | H01Q 3/34 |
| 11,228,982 | B2* | 1/2022 | Gubeskys | H04B 1/3838 |
| 2020/0081093 | A1* | 3/2020 | Rimini | G06F 3/044 |
| 2021/0306022 | A1* | 9/2021 | Fernando | H04B 1/3833 |

* cited by examiner

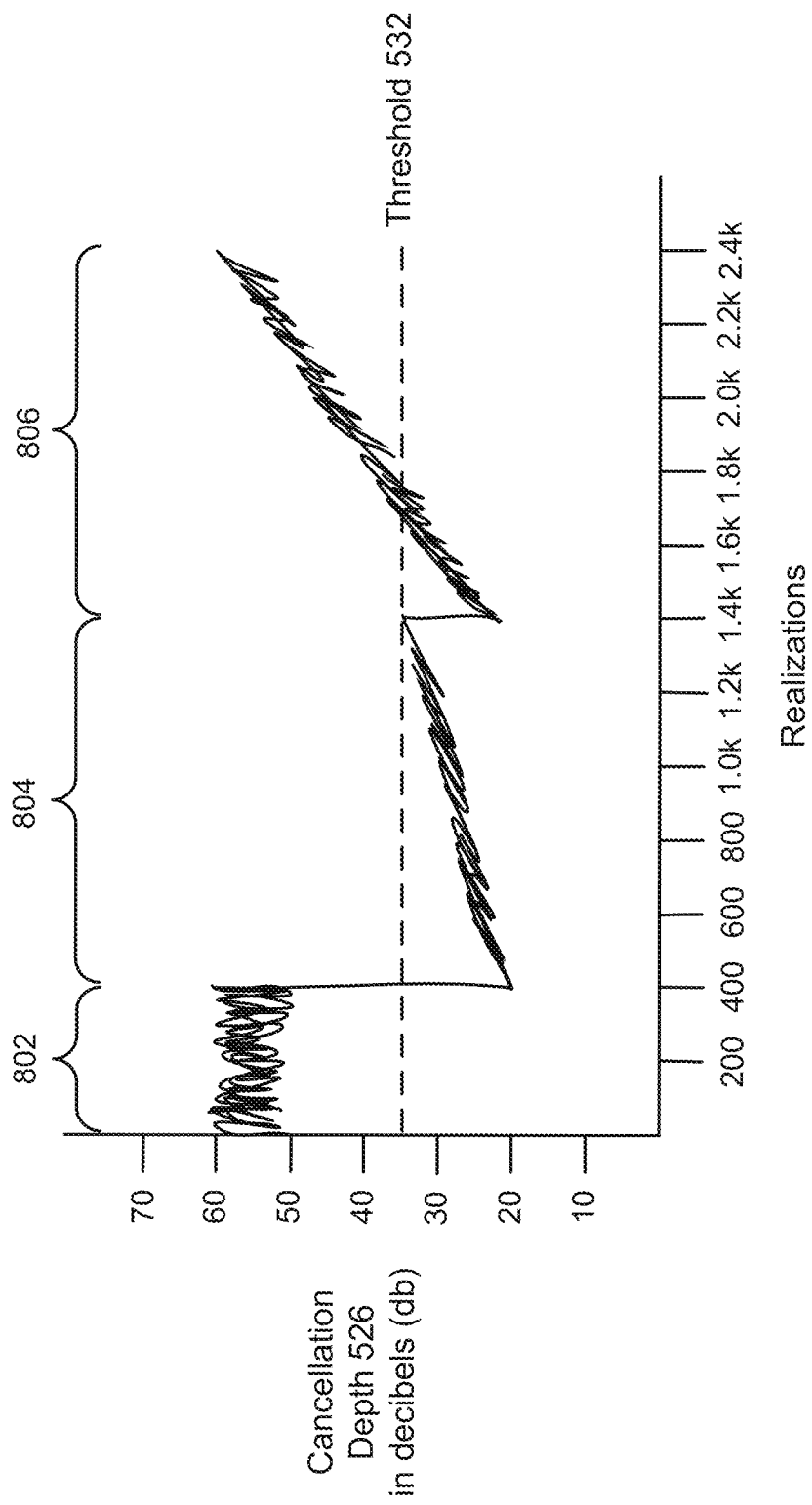

HUMAN PROXIMITY SENSOR USING SHORT-RANGE RADAR

BACKGROUND OF THE DISCLOSURE

1. Field of the Disclosure

Aspects of the disclosure relate generally to near-field detection of human tissue.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a user equipment performs a method to detect a proximity of human tissue. The method includes determining a mutual coupling signal associated with a transmit antenna and a receive antenna of the user equipment, determining a mutual coupling difference between the mutual coupling signal and a reference mutual coupling signal, determining a beat signal difference between a current beat signal and a previous beat signal, determining an amount of micro-motion that is present within a near field of the user equipment based at least in part on the beat signal difference, determining whether human tissue is present within the near field of the user equipment based on the mutual coupling difference and the amount of micro-motion, determining an amount of radio frequency exposure associated with the human tissue based on determining that the human tissue is present within the near field of the user equipment, and reducing the amount of radio frequency exposure associated with the human tissue based on determining that the amount of radio frequency exposure exceeds a maximum permissible exposure.

In an aspect, a user equipment includes a memory, at least one transceiver, and at least one processor communicatively coupled to the memory and the at least one transceiver. The at least one processor is configured to determine a mutual coupling signal associated with a transmit antenna and a receive antenna of the user equipment, determine a mutual coupling difference between the mutual coupling signal and a reference mutual coupling signal, determine a beat signal difference between a current beat signal and a previous beat signal, determine an amount of micro-motion that is present within a near field of the user equipment based at least in part on the beat signal difference, determine whether human tissue is present within the near field of the user equipment based on the mutual coupling difference and the amount of micro-motion, determine an amount of radio frequency exposure associated with the human tissue based on determining that the human tissue is present within the near field of the user equipment, and reduce the amount of radio frequency exposure associated with the human tissue based on determining that the amount of radio frequency exposure exceeds a maximum permissible exposure.

In an aspect, an apparatus includes means for determining a mutual coupling signal associated with a transmit antenna and a receive antenna of the apparatus, means for determining a mutual coupling difference between the mutual coupling signal and a reference mutual coupling signal, means for determining a beat signal difference between a current beat signal and a previous beat signal, means for determining an amount of micro-motion that is present within a near field of the apparatus based at least in part on the beat signal difference, means for determining whether a human tissue is present within the near field of the apparatus based on the mutual coupling difference and the amount of micro-motion, means for determining an amount of radio frequency exposure associated with the human tissue based on determining that the human tissue is present within the near field of the apparatus, and means for reducing the amount of radio frequency exposure associated with the human tissue based on determining that the amount of radio frequency exposure exceeds a maximum permissible exposure.

In an aspect, a non-transitory computer-readable storage medium stores instructions executable by one or more processors to determine a mutual coupling signal associated with a transmit antenna and a receive antenna of a user equipment, determine a mutual coupling difference between the mutual coupling signal and a reference mutual coupling signal, determine a beat signal difference between a current beat signal and a previous beat signal, determine an amount of micro-motion that is present within a near field of the user equipment based at least in part on the beat signal difference, determine whether human tissue is present within the near field of the user equipment based on the mutual coupling difference and the amount of micro-motion, determine an amount of radio frequency exposure associated with the human tissue based on determining that the human tissue is present within the near field of the user equipment, and reduce the amount of radio frequency exposure associated with the human tissue based on determining that the amount of radio frequency exposure exceeds a maximum permissible exposure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates a plot of cancellation depth, according to aspects of the disclosure.

DETAILED DESCRIPTION

Figure 1:
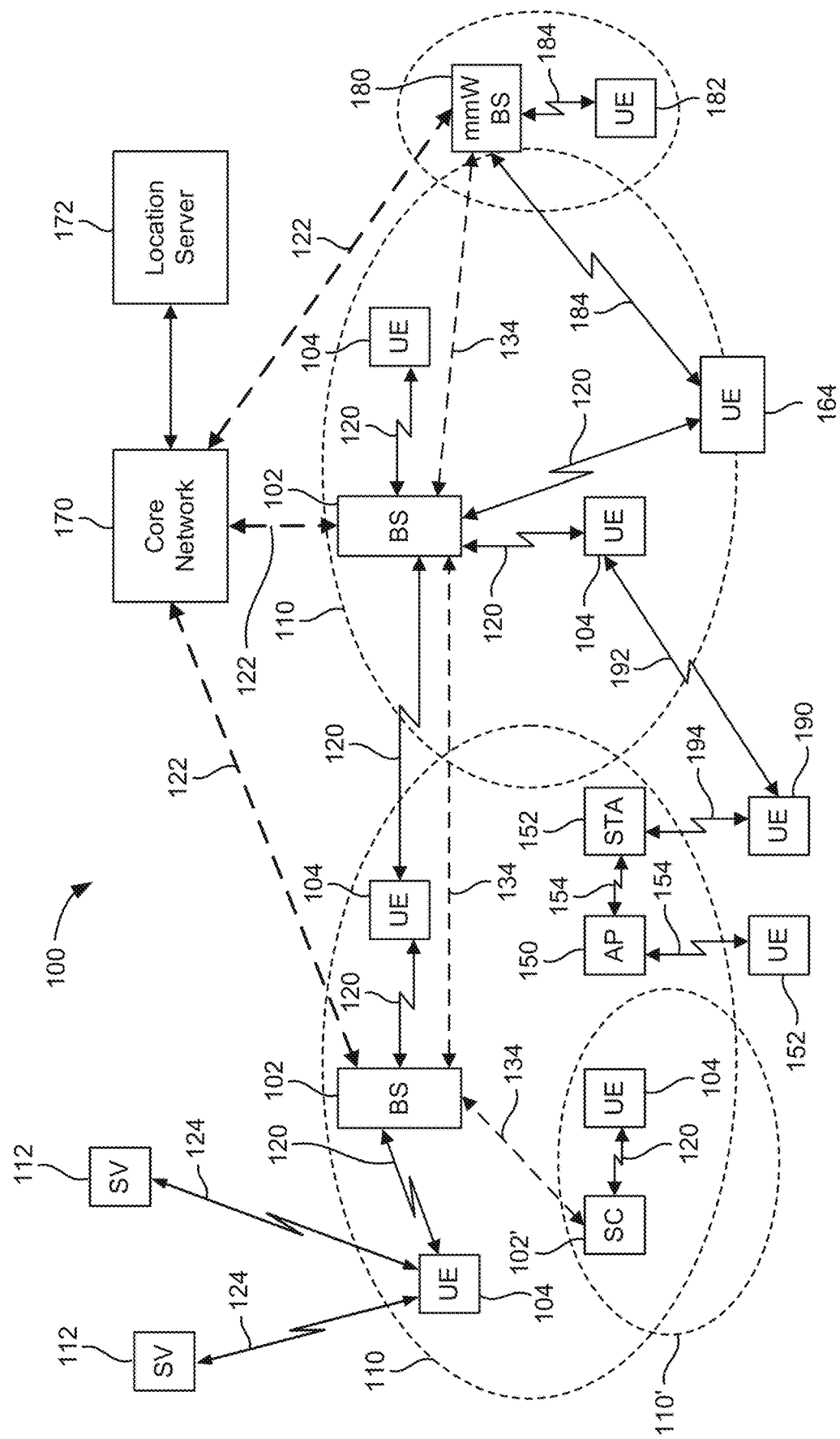
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Next generation 5G cellular systems use the millimeter wave (mmW) portion of the spectrum which has a large available bandwidth that enables high speed (e.g., tens of Gigabits per second (Gbps)) data rates. Radio transmission in the mmW spectrum (e.g., 28 Giga Hertz (GHz), 39 GHz and the like) are, in many countries, subject to stringent exposure regulations for living objects and human tissue. For example, in the United States, the Federal Communications Commission (FCC) mandates a Maximum Permissible Exposure (MPE) of 1 milliwatt (mW) per square centimeter ($cm^2$) for frequencies greater than 6 GHz. The MPE may be exceeded when a user equipment (UE) is transmitting (Tx) at high power using, for example, high beamforming gain. In the case of hand held UEs, such as, for example, smart phones, the UE is required by the FCC to detect when human tissue is within a close proximity (e.g., 4 centimeters (cm) or less) from radiating elements of the UE. This close proximity region is referred as a near-field. The systems and techniques described herein enable near-field detection of human tissue.

In one aspect, the systems and techniques described herein may be used to perform near-field detection of human tissue based on detecting a perturbation in mutual coupling. In Wi-Fi radar (also referred to as radio frequency (RF) sensing), packets are transmitted by a transmit (Tx) antenna array of a UE and almost immediately (e.g., simultaneously) received by a receive (Rx) antenna array of the UE. The transmitted packets are received by the Rx antenna as (i) a direct transmission and (ii) a reflected transmission. The reflected transmission may be a result of the transmitted packets reflecting off of an object in the nearfield, such as human tissue (e.g., a user's hand). Mutual coupling describes energy absorbed by the Rx antenna when the Tx antenna is transmitting, e.g., the direct transmission. Detecting perturbations in mutual coupling is effective in detecting a target that is in motion in a detection zone (e.g., proximity region), such as when a user's hand moves in close proximity to the UE.

A reference mutual coupling signal may be repeatedly (e.g., substantially continuously) compared against a received coupling signal to determine if a variation has occurred as a result of an object (e.g., human tissue) in the near-field. The received coupling signal includes a static component and a dynamic component that indicates the movement of an object in the near-field. In some aspects, the metric used to quantify the similarity between these signals is a cancellation depth that is based on an inverse of mean squared errors (MSE), e.g., 1/MSE. The reference mutual coupling signal may be determined by using a low-pass filter to extract the static component from the received coupling signal.

When a user is holding a UE or has placed a hand near the UE, the human tissue may engage in relatively small movements (e.g., micro-motion), which result in small changes to the mutual coupling. A static human hand has characteristics that are similar to mutual coupling, e.g., the reflected signal is relatively constant over multiple observations. Thus, monitoring the mutual coupling may result in the system "learning" the presence of the static hand, which may result in the presence of the hand becoming part of the reference signal, resulting in a high cancellation depth. When the cancellation depth is relatively high (e.g., greater than or equal to a threshold), the detector may determine that no human tissue is present in the near-field, thereby not detecting the presence of the static hand. To enable the detection of the static hand in the near-field, the systems and techniques are enhanced to detect micro-motion. In general, humans are susceptible to tremors, e.g., tingling induced by nerves, even when body parts are at rest, such as when a hand is placed on a table (e.g., near a UE). The systems and techniques are enhanced to detect micro-motion caused by nerve pulses and to slow the learning rate of the adaptive filter. For example, after the systems and techniques detect micro-motion, the value of a pole filter is changed (e.g., increased) to retain a previously learned mutual coupling and reduce a learning rate associated with the static hand. Thus, the systems and techniques used to detect perturbations in mutual coupling may be enhanced to detect when the user's hand is relatively static (e.g., no motion) while in close proximity to the UE.

The system and techniques may detect micro-motion in near-field of a UE by determining a delta between a current beat signal and a previous beat signal. In a Frequency-Modulated Continuous-Wave (FMCW) radar system, a chirp signal is transmitted using the Tx antenna. A chirp signal is an FM-modulated signal of a known stable frequency whose instantaneous frequency is varied linearly over a fixed period of time (sweep time) by a modulating signal. The transmitted signal hits a target (e.g., a human hand) and is reflected to create a reflected signal that is received by the Rx antenna. The frequency difference between the received signal and the transmitted signal increases with delay, where the delay is linearly proportional to the range (e.g., the distance between the target and the radar). The echo from the target is mixed with the transmitted signal and down-converted to produce the beat signal. If the environment is static (e.g., devoid of any motion, including micro-motion), then the delta between a current beat signal and a previous beat signal may be accounted by noise. If micro-motion is present in the environment, the delta between a current beat signal and a previous beat signal is likely higher than noise to due to perturbations caused by micro-motion. For this reason, Rise-over-Noise (RoN) may be used to determine the presence of micro-motion in the near-field. In a static environment, RoN is close to 1 (e.g., 0 decibels (dB)). When micro-motion is present, RoN is greater than 1. The amount of noise present can be obtained by various methods including, for example, a negative frequency of the beat signal, using leading or trailing samples of the beat signal, and the like. The learning rate of the mutual coupling monitoring system may be adjusted based on the amount of micro-motion present. For example, the mutual coupling monitoring system may use a single-pole infinite impulse and response (IIR) filter that has a pole that is adjusted based on RoN. In addition, in some aspects, to reduce an effect of noise, a smoothing filter may be used on RoN.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
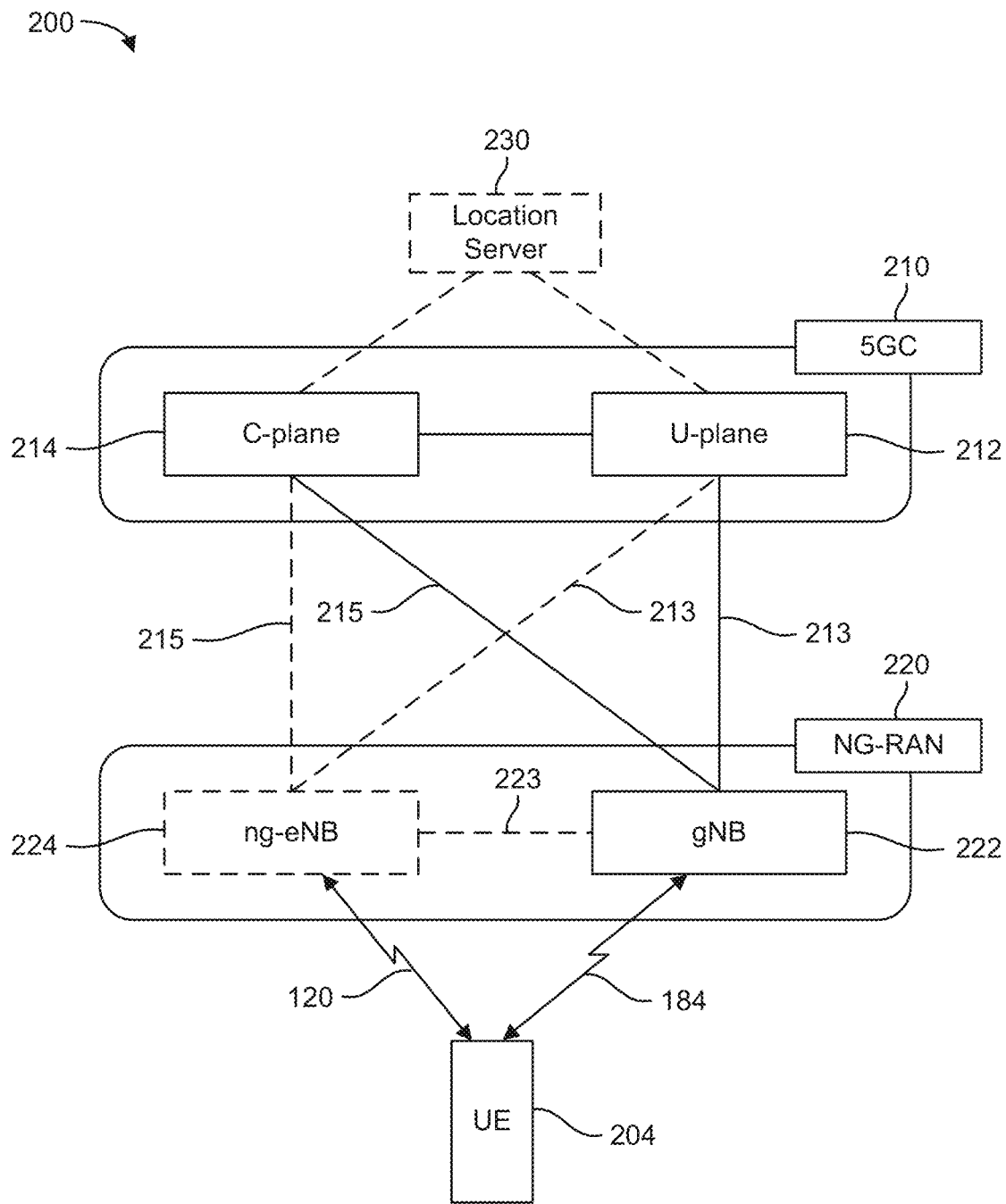
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
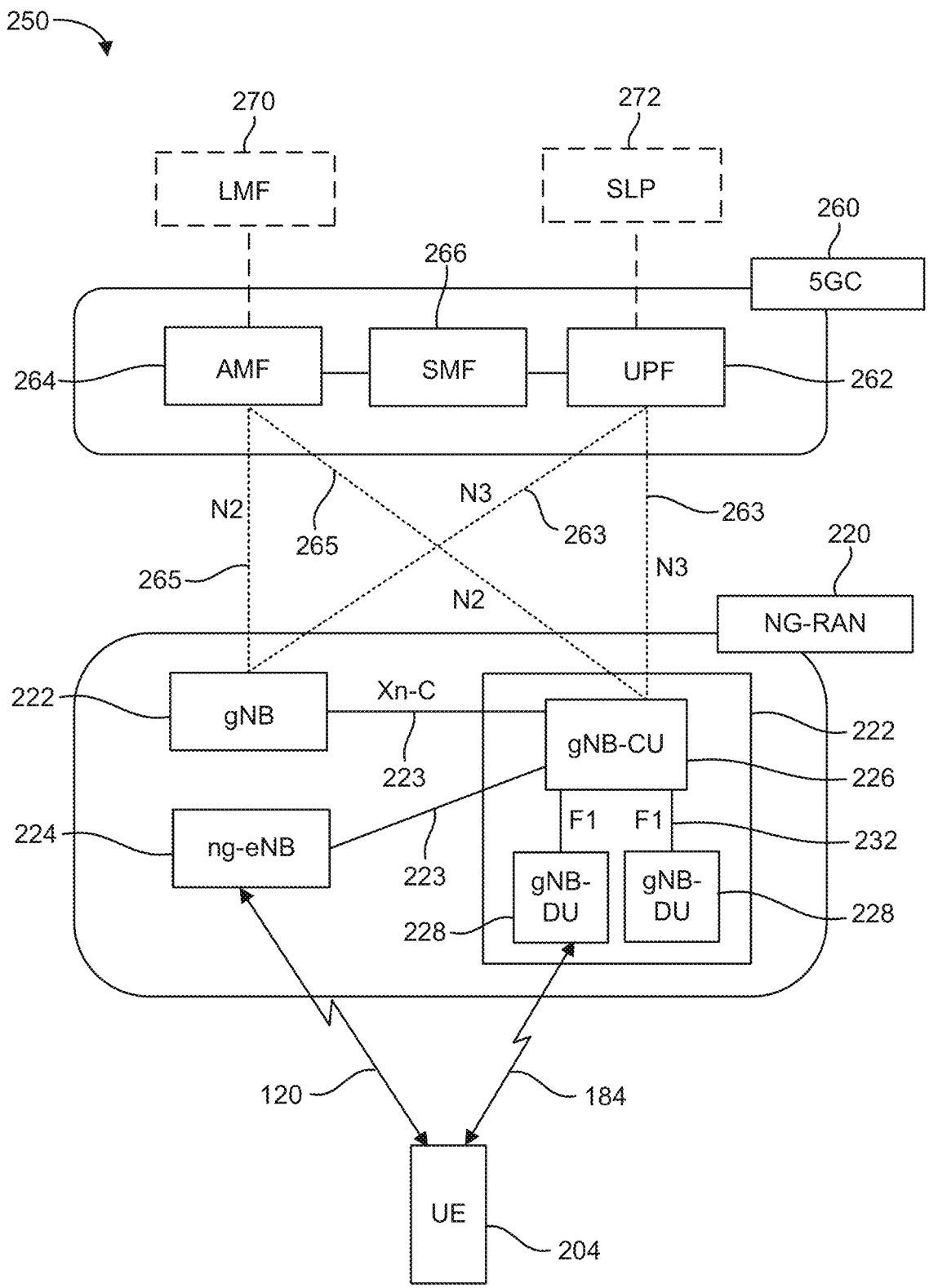

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
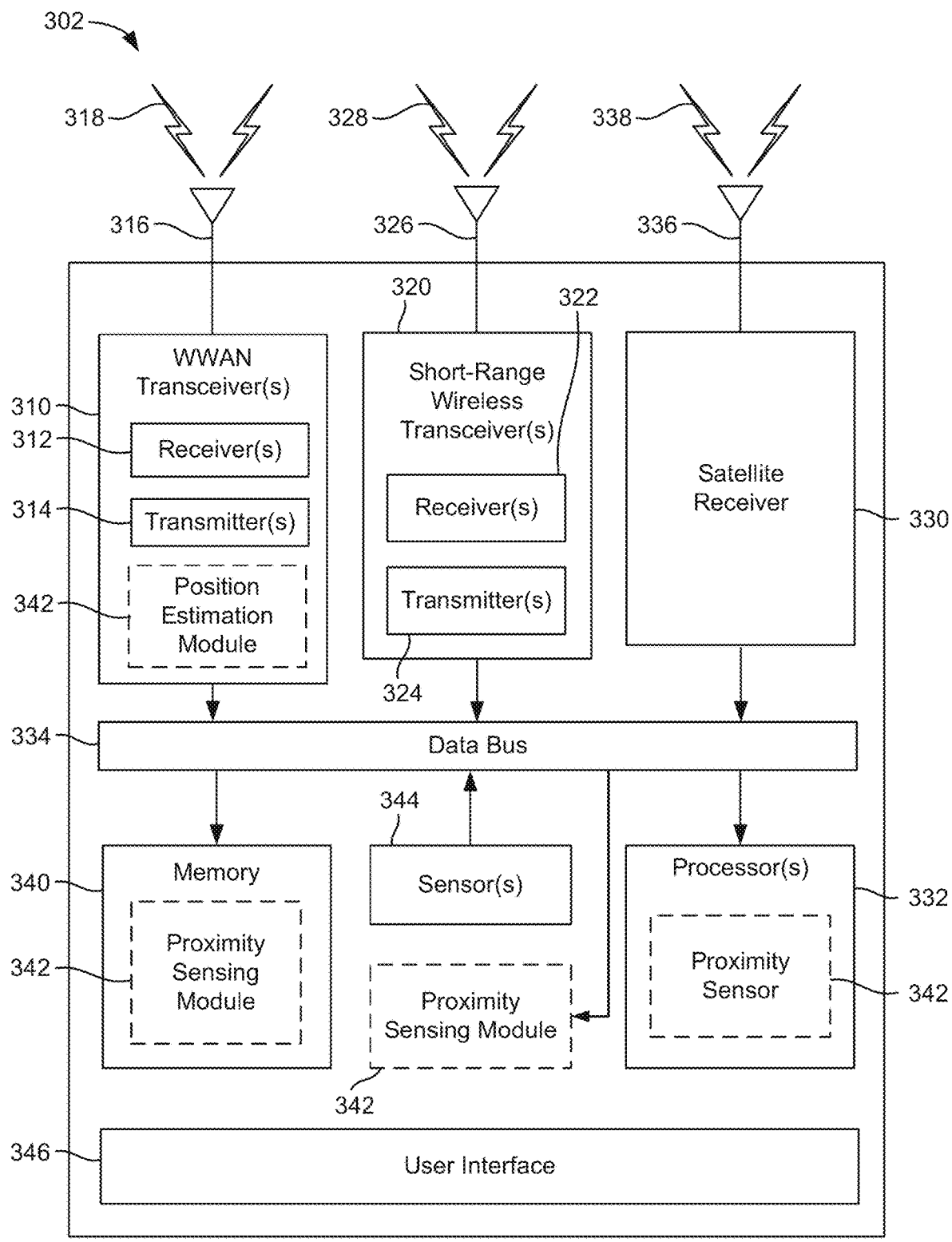
FIGS. 3A, 3B, and 3C are simplified block diagrams of several sample aspects of components that may be employed in a user equipment (UE), abase station, and a network entity, respectively, and configured to support communications as taught herein.
Figure 3B:
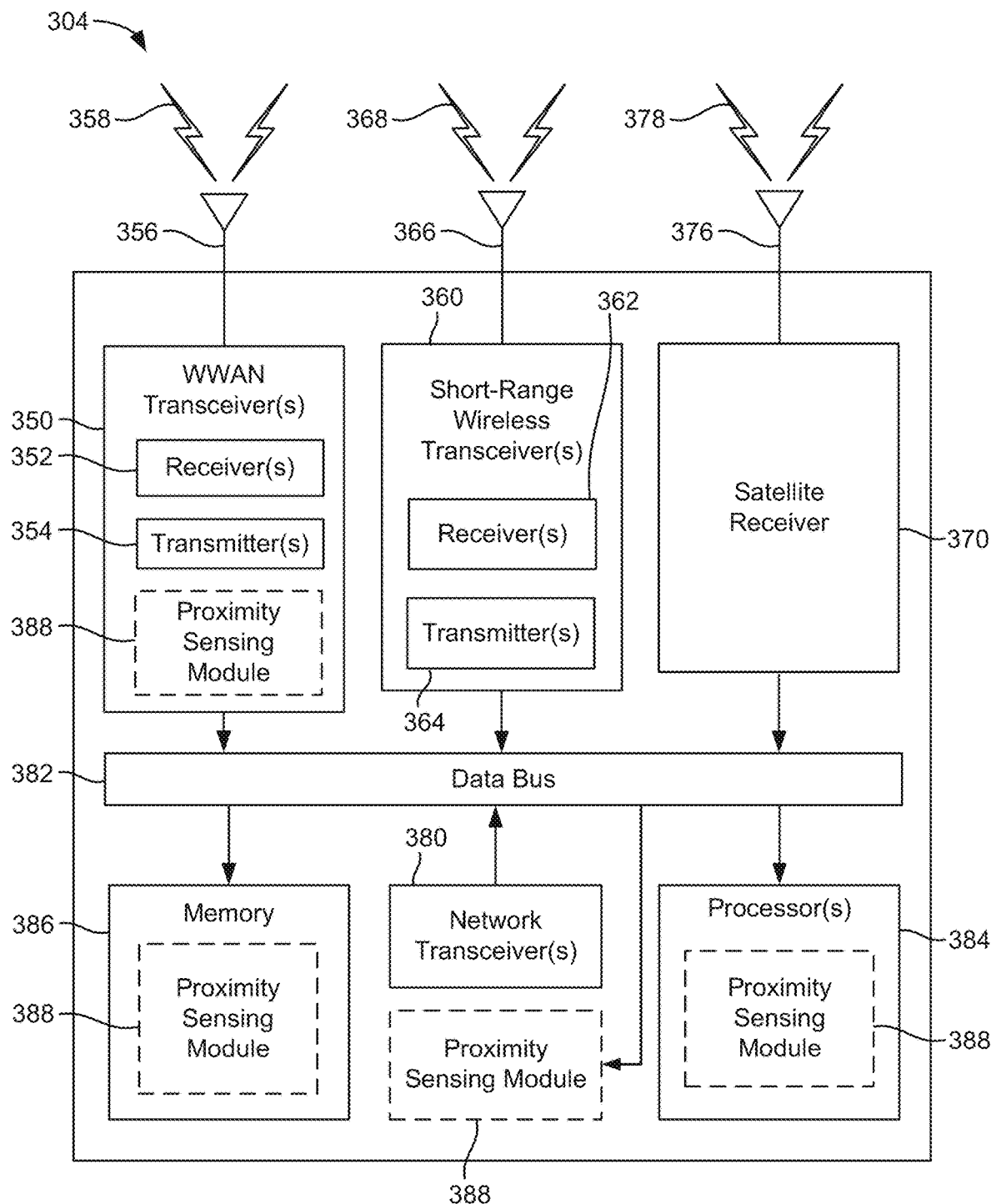
Figure 3C:
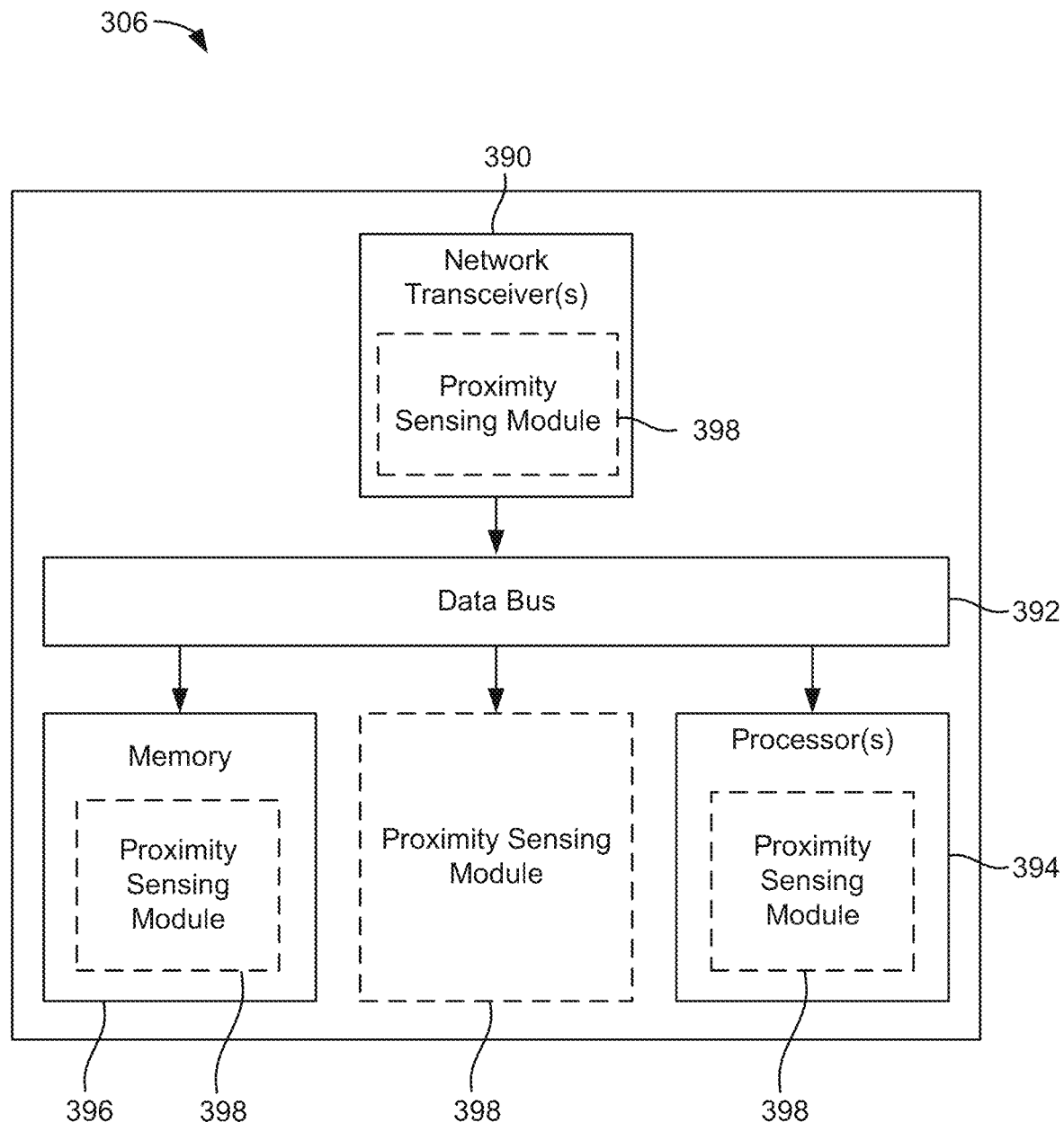

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum).

The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Proximity Sensing Module 342, 388, and 398, respectively. The Proximity Sensing Module 342, 388, and 398 may be hardware circuits that are part of or coupled to the processors 332, 384, and 394, respectively, that, when executed, cause the UE 302, the base station 304, and the network entity 306 to perform the functionality described herein.

In other aspects, the Proximity Sensing Module 342, 388, and 398 may be external to the processors 332, 384, and 394 (e.g., part of a modem processing system, integrated with another processing system, etc.). Alternatively, the Proximity Sensing Module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Proximity Sensing Module 342, which may be, for example, part of the one or more WWAN transceivers 310, the memory 340, the one or more processors 332, or any combination thereof, or may be a standalone component. FIG. 3B illustrates possible locations of the Proximity Sensing Module 388, which may be, for example, part of the one or more WWAN transceivers 350, the memory 386, the one or more processors 384, or any combination thereof, or may be a standalone component. FIG. 3C illustrates possible locations of the Proximity Sensing Module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite receiver 330. By way of example, the sensor(s) 344 may include an accelerometer (e.g., a micro-electrical mechanical system (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Proximity Sensing Module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
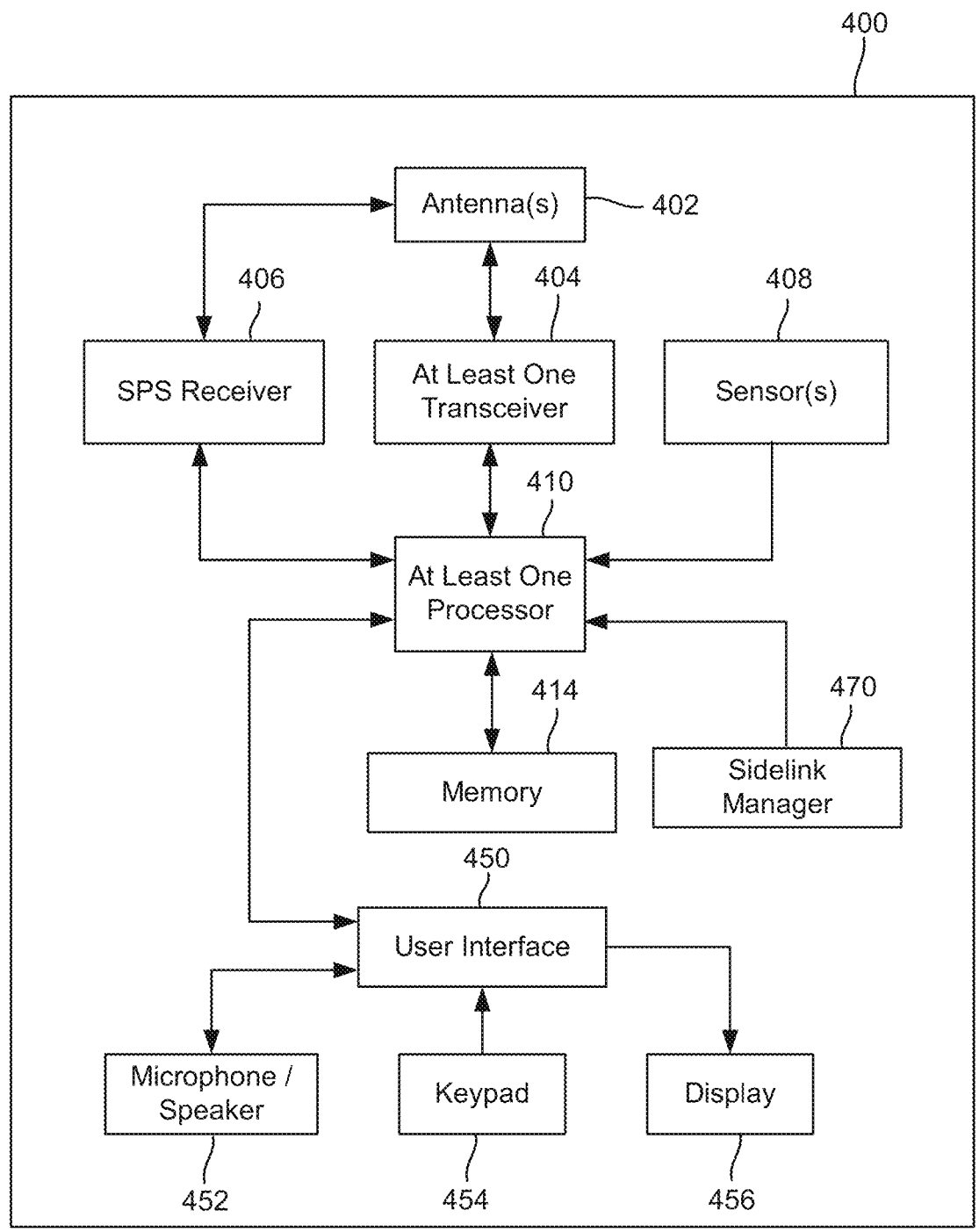
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
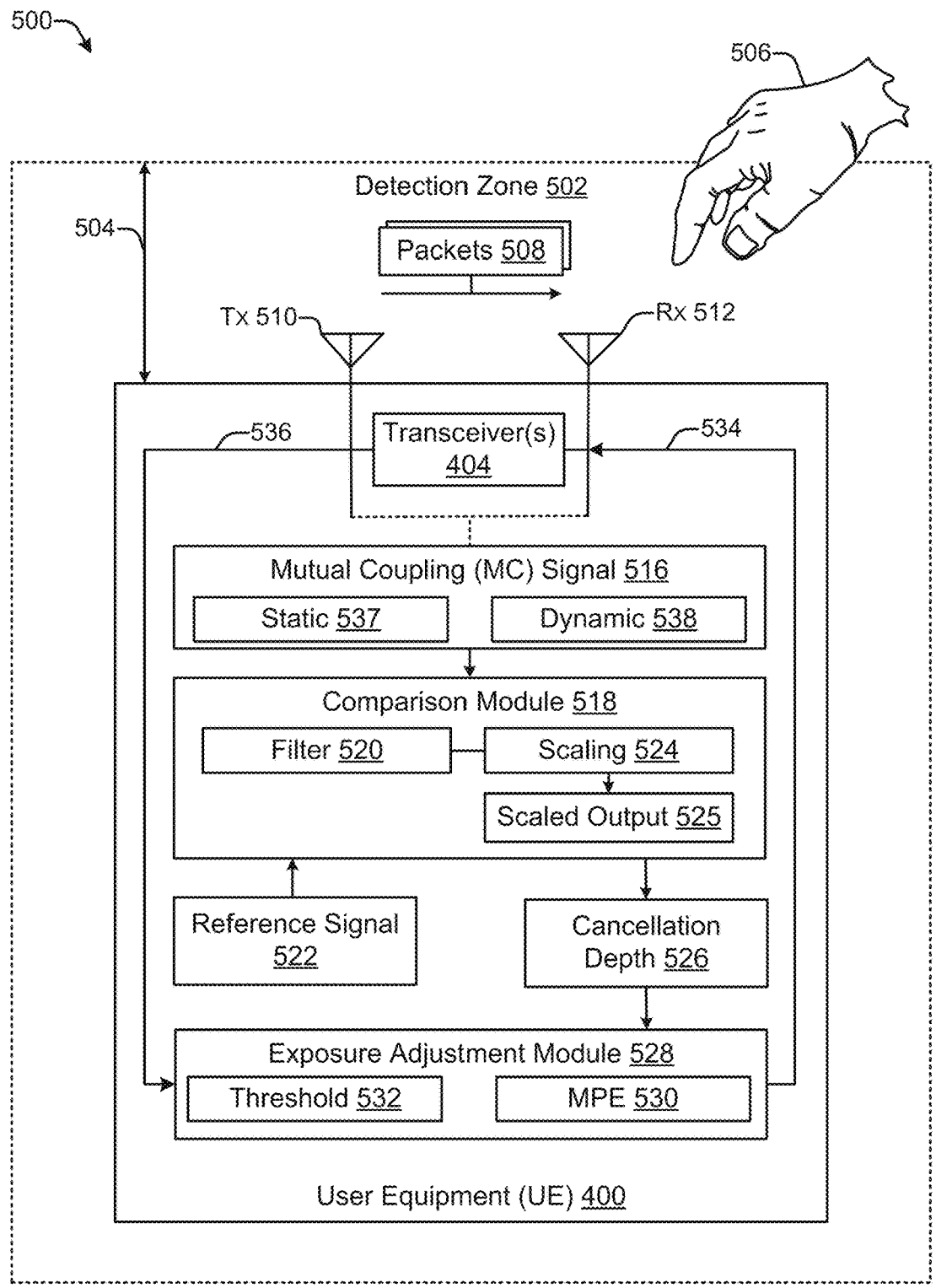
FIG. 5 is a block diagram illustrating detecting a presence of human tissue in a detection zone, according to aspects of the disclosure.

FIG. 5 is a block diagram 500 illustrating detecting a presence of human tissue in a detection zone, according to aspects of the disclosure. The UE 400 may create a detection zone 502 of at least a distance 504 around the UE 400 to detect the presence of human tissue, such as a hand 506. For example, in the United States, the distance 504 may be at least 4 cm to comply with FCC regulations. Of course, in other countries, the distance 504 may be different than 4 cm to comply with local regulations.

The UE 400 may periodically (or substantially continuously) transmit packets 508 from the transmit (Tx) antenna (array) 510 that are received by the receiver (Rx) antenna (array) 512. One or more transceivers 404 may be used to transmit and receive the packets 508. The packets 508 may use Wi-Fi-based radar techniques to create the detection zone 502.

A comparison module 518 may monitor a mutual coupling signal 516 to detect perturbations (e.g., changes) in the mutual coupling signal 516. For example, when the comparison module 518 detects perturbations in the mutual coupling signal 516, the UE 400 may determine that human tissue, such as the hand 506, is present in the detection zone 502. The comparison module 518 may use a filter 520 to compare a reference signal 522 with the mutual coupling signal 516. For example, in some aspects, the filter 520 may be implemented as an infinite impulse and response (IIR) filter. The output of the filter 520 may be scaled using a scaling module 524 to provide a scaled output 525 that is used to determine a cancellation depth 526.

An exposure adjustment module 528 may determine whether the cancellation depth 526 exceeds a threshold 532, indicating that a human tissue, such as the hand 506, is in the detection zone 502. The exposure adjustment module 528 may use a maximum permissible exposure (MPE) 530 that is set by a regulatory body such as, for example, the FCC in the United States to determine whether to modify (e.g., reduce) a power level 536 of the transceivers 404. For example, if the exposure adjustment module 528 determines that the cancellation depth 526 is relatively low (e.g., below the threshold 532), then the exposure adjustment module 528 may determine that no human tissue is present in the detection zone 502. If the exposure adjustment module 528 determines that the cancellation depth 526 is greater than or equal to the threshold 532, then the exposure adjustment module 528 may determine that human tissue, such as the hand 506, is present in the detection zone 502 and provide an instruction 534 to one or more of the transceivers 404 to reduce an amount of power being used to transmit the packets 508, thereby reducing the amount of exposure of the human tissue. In this way, perturbations in the mutual coupling signal 516 may be monitored to determine the presence or absence of human tissue, such as the hand 506, in the detection zone 502 (e.g., near-field) around the UE 400.

Thus, the UE 400 may repeatedly (e.g., substantially continuously) compare the reference signal 522 with the received mutual coupling signal 516 to determine if a variation has occurred as a result of the presence of human tissue (e.g., the hand 506) in the detection zone 502 (e.g., near-field). The received mutual coupling signal 516 includes a static component 537 and a dynamic component 538. The dynamic component 538 indicates the movement of human tissue (e.g., the hand 506) in the detection zone 502. The cancellation depth 526 is used to quantify the similarity between the mutual coupling signal 516 and the reference signal 522. In some aspects, the cancellation depth 526 is based on an inverse of mean squared errors (MSE), e.g., 1/MSE. The reference signal 522 may be determined by using the low-pass filter 520 to extract the static component 537 from the received mutual coupling signal 516.

In some aspects, the cancellation depth 526 ("CancDepth") may be determined as follows:

$$CancDepth = \frac{\|y(n)\|^2}{\|y_{postIC}\|^2} = \begin{cases} \frac{\|y(n,p)\|^2}{\sigma_n^2} \sim 50 \text{ dB, if } P = OS \\ \frac{\|y(n,p)\|^2}{\|\epsilon(n)\|^2 + \sigma_n^2}, < 50 \text{ dB, } P = \text{tissue present} \end{cases}$$

where:
n=sample index
y(n)=mutual coupling signal 516
$y_{postIC}$=scaled output 525 (e.g., post Interference Cancellation (IC))
$\epsilon$(n)=residue after cancellation
$\sigma_n$=noise
P=target types, e.g., Open Space (OS) occurs when human tissue is absent (e.g., not present) and threshold 532=about 50 db.

When a user is holding or has placed a hand near the UE 400, the human tissue may engage in relatively small movements (e.g., micro-motion), which result in small changes to the mutual coupling signal 516. A static human hand (e.g., the hand 506) has characteristics that are similar to mutual coupling, e.g., the reflected signal is relatively constant over multiple observations. Thus, monitoring the mutual coupling signal 516 may result in the UE 400 "learning" the presence of the static hand 506, which may result in the presence of the hand 506 becoming part of the reference signal 522, resulting in a high value for the cancellation depth 526, causing the comparison module 518 to erroneously determine that no human tissue is present in the detection zone 502, thereby not detecting the presence of the static hand 506. To enable the detection of the static hand 506 in the detection zone 502, the system illustrated in FIG. 5 may be enhanced, as illustrated in FIG. 6, to detect micro-motion.

Figure 6:
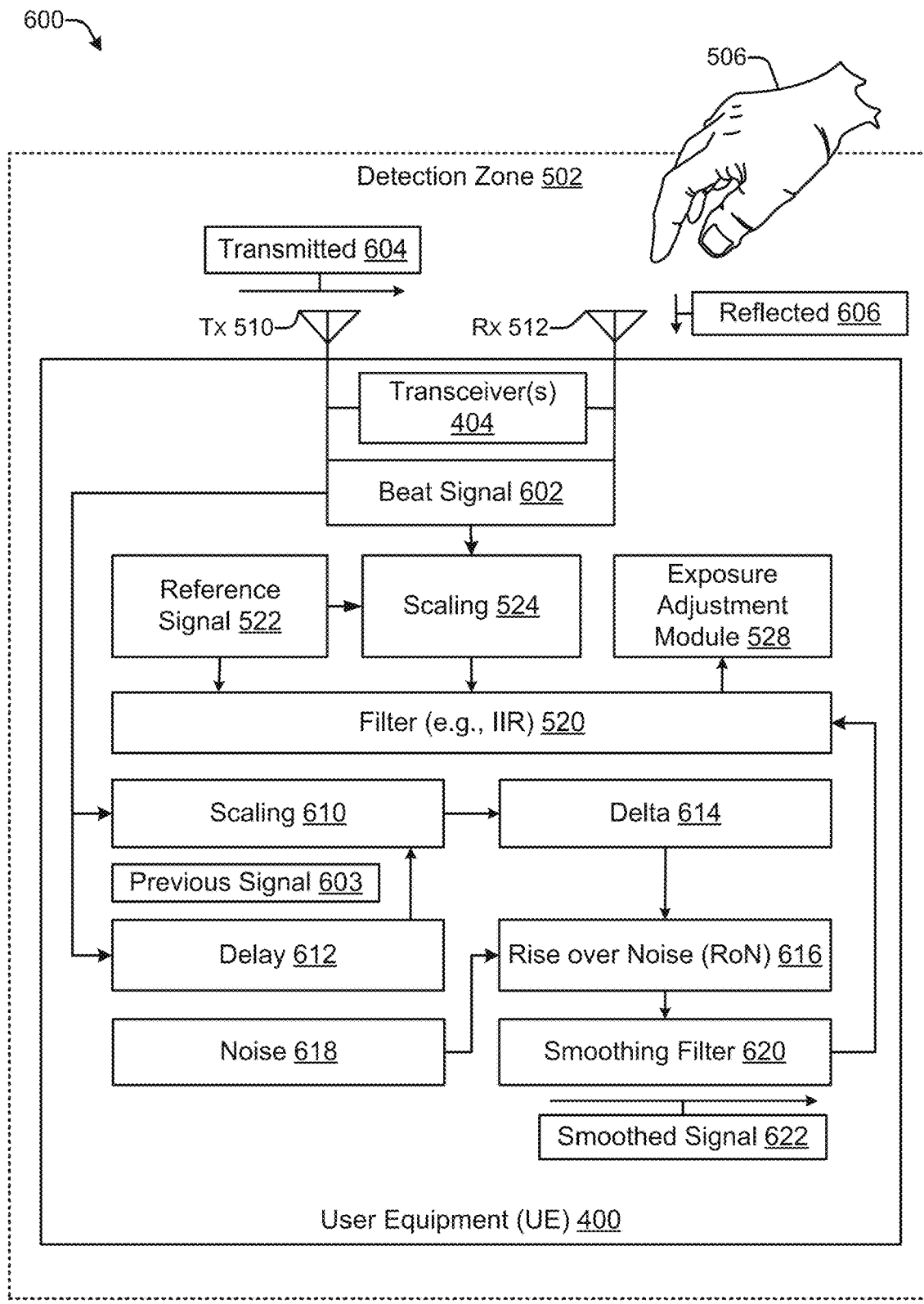
FIG. 6 is a block diagram illustrating detecting micro-motion in a detection zone, according to aspects of the disclosure.

FIG. 6 is a block diagram 600 illustrating detecting micro-motion in a detection zone, according to aspects of the disclosure. The block diagram 600 is capable of detecting micro-motion in the detection zone 502 (e.g., near-field) of the UE 400. by determining a difference between a current beat signal 602 and a previous beat signal 603. The previous beat signal 603 is processed using a delay 612 to enable the current beat signal 602 to be compared with the previous beat signal 603. For example, in a Frequency-Modulated Continuous-Wave (FMCW) radar system, a chirp signal is transmitted to create a transmitted signal 604 using the Tx antenna 510. A chirp signal is an FM-modulated signal of a known stable frequency whose instantaneous frequency is varied linearly over a fixed period of time (sweep time) by a modulating signal. The transmitted signal 604 hits a target (e.g., the hand 506) and is reflected to create a reflected signal 606 that is received by the Rx antenna 512. The frequency difference between the reflected signal 606 and the transmitted signal 604 increases with delay, where the delay is linearly proportional to the range (e.g., the distance between the target and the radar). The reflected signal 606 (e.g., echo) from the target (e.g., the hand 506) is mixed with the transmitted signal 604 and down-converted to create the beat signal 602.

If the detection zone 502 is static (e.g., devoid of motion, including devoid of micro-motion), then a delta 614 between the beat signal 602 and the previous beat signal 603 may primarily be caused by noise 618. Even if the hand 506 is relatively static, if the hand 506 is present in the detection zone 502, then micro-motion is present in the detection zone 502. When micro-motion caused by the hand 506 is present, then the delta 614 between the beat signal 602 and the previous beat signal 603 (after being scaled using scaling 610) is likely higher than a noise 618 due to perturbations caused by the micro-motion. Therefore, a Rise-over-Noise (RoN) 616 may be used to determine the presence of micro-motion in the detection zone 502 (e.g., near-field). The RoN 616 may be determined by, for example, by dividing the delta 614 by the noise 618. When no micro-motion is present in the detection zone 502 (e.g., the hand 506 is absent), the RoN 616 may be approximately 1 (e.g., corresponding to 0 decibels (dB)). When micro-motion is present in the detection zone 502, RoN 616 is greater than 1. The amount of noise 618 that is present can be obtained by various methods including, for example, a negative frequency of the beat signal 602, using leading samples or trailing samples of the beat signal 602, another technique, or any combination thereof. A learning rate of the UE 400 may be adjusted based on an amount of micro-motion present in the detection zone 502. For example, the UE 400 may use the filter 520 that is implemented using a single-pole infinite impulse and response (IIR) filter that has a pole that is adjustable based on RoN 616. In addition, in some aspects, to reduce an effect of noise, a smoothing filter 620 may be used on RoN 616 to create a smoothed signal 622.

Thus, FIG. 6 illustrates a system that can be used to (1) detect when human tissue, such as the hand 506, enters the detection zone 502 and (2) detect when the human tissue is present in the detection zone 502, even if the human tissue is relatively static, by detecting the micro-motions created by the human tissue. The system detects when human tissue enters the detection zone 502 by monitoring perturbations in the mutual coupling signal 516 of FIG. 5. The system detects the micro-motions created by the human tissue in the detection zone 502 by monitoring the RoN 616.

Figure 7:
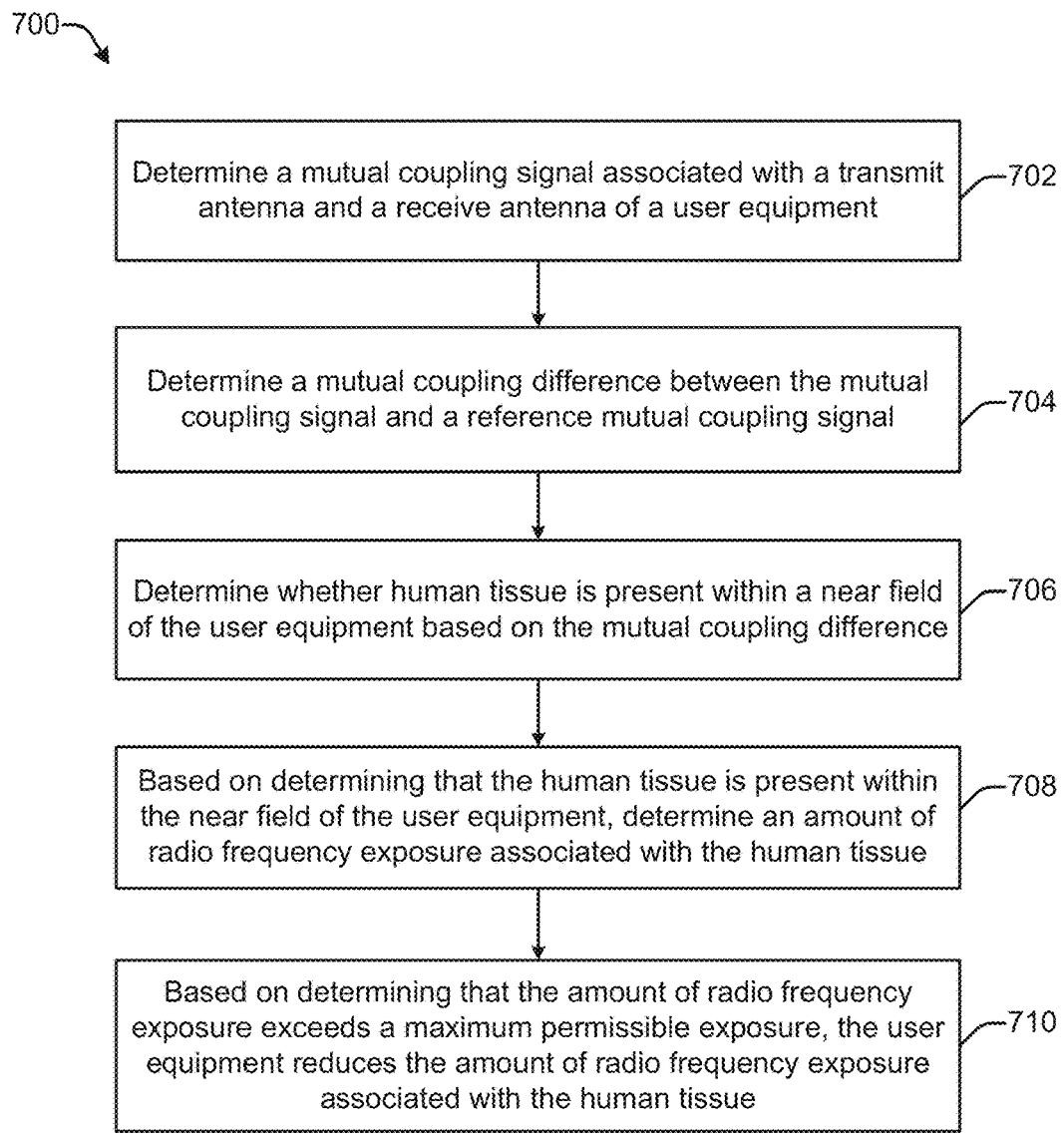
FIG. 7 illustrates a process that includes reducing an amount of radio frequency exposure associated with human tissue, according to aspects of the disclosure.

In the flow diagram of FIG. 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 700 is described with reference to FIGS. 1, 2, 3, 4, 5, and 6 as described above, although other models, frameworks, systems and environments may be used to implement this process FIG. 7 illustrates an exemplary process 700 that includes reducing an amount of radio frequency exposure associated with human tissue, according to aspects of the disclosure. The process 700 may be performed by the UE 400 of FIGS. 4, 6, and 7.

At 702, the UE may determine a mutual coupling signal associated with the transmit antenna and a receive antenna of the UE. For example, in FIG. 5, the comparison module 518 may determine the mutual coupling signal 516. In an aspect, 702 may be performed by processor 410, memory 414 (e.g., the comparison module 518), and the at least one transceiver 404, any or all of which may be considered means for performing this operation.

At 704, the UE may determine a mutual coupling difference between the mutual coupling signal and a reference mutual coupling signal. For example, in FIG. 5, the comparison module 518 may compare the mutual coupling signal 516 to the reference signal 522 to determine the cancellation depth 526 that indicates a difference between the mutual coupling signal 516 and the reference signal 522. In an aspect, 704 may be performed by processor 410, memory 414 (e.g., that stores the comparison module 518), and the at least one transceiver 404, any or all of which may be considered means for performing this operation.

At 706, the UE may determine whether human tissue is present within the near field of the user equipment based on the mutual coupling difference. For example, in FIG. 5, the exposure adjustment module 528 may use the cancellation depth 526 (e.g., that is determined based on the difference between the mutual coupling signal 516 and the reference signal 522) to determine whether human tissue, such as the hand 506, is present in the near field (e.g., the detection zone 502) of the UE 400. In an aspect, 706 may be performed by processor 410 and memory 414 (e.g., that stores the exposure adjustment module 528), any or all of which may be considered means for performing this operation.

At 708, the UE may, based on determining that the human tissue is present within the near field of the user equipment, determine an amount of radio frequency exposure associated with the human tissue. For example, in FIG. 5, the exposure adjustment module 528 may, based on determining that the cancellation depth 526 indicates the presence of human tissue in the detection zone 502, determine the power level 536 associated with the transceivers 404 to determine an amount of radio frequency exposure to which the human tissue (e.g., the hand 506) is being subject. In an aspect, 708 may be performed by processor 410, memory 414 (e.g., that stores the exposure adjustment module 528), and the at least one transceiver 404, any or all of which may be considered means for performing this operation.

At 710, the UEs may, based on determining that the amount of radio frequency exposure exceeds a maximum permissible exposure, reduce the amount of radio frequency exposure associated with the human tissue. For example, in FIG. 6, the exposure adjustment module 528 may determine whether the power level 536 exceeds the maximum permissible exposure 530. If the power level 536 exceeds the maximum permissible exposure 530, the exposure adjustment module 528 may cause the transceivers 404 to reduce an amount of power used to transmit the packets 508. In an aspect, 706 may be performed by processor 410, and memory 414 (e.g., that stores the exposure adjustment module 528), and the at least one transceiver 404, any or all of which may be considered means for performing this operation.

Thus, a UE may monitor perturbations to a mutual coupling signal to detect the presence of human tissue in a detection zone (e.g., near field) around the UE. If the UE detects the presence of human tissue, then the UE checks the radio frequency transmission power and determines if the amount of power being used complies with the maximum permissible exposure under applicable local laws. If the amount of power being used exceeds the maximum permissible exposure, then the UE reduces the amount of power being used to below the maximum permissible exposure. Thus, a technical advantage of the process 700 is to enable the UE 400 to comply with maximum permissible exposure regulations. A second technical advantage is that a tissue user of the UE is not subject to an amount of radiation that exceeds the maximum permissible exposure, thereby protecting the user's health and well-being.

FIG. 8 illustrates a plot of cancellation depth, according to aspects of the disclosure. In FIG. 8, realizations are on the x-axis and the cancellation depth 526 is on the y-axis. During a first time period 802 (e.g., realizations 0 to about 400), illustrates that cancellation depth is 50 db or greater when there is open space (OS), e.g., no human tissue is present.

During a second time period 804 (e.g., realizations from about 401 to about 1400), the presence of human tissue (e.g., the hand 506 of FIG. 5), causes the cancellation depth 526 to drop and remain below (e.g., less than) the threshold 532. The hand 506 may be relatively static during the second time period 804.

During a third time period 806 (e.g., realizations from about 1401 to about 2400), the human tissue is absent (e.g., there is open space resulting from removing the hand 506). During the third time period 806, the cancellation depth 526 starts to increase until the cancellation depth 526 is greater than the threshold 532.

Thus, the systems and techniques described herein enable a UE to detect the presence of human tissue, such as a hand, and continue to detect the human tissue even when the human tissue is relatively static. The systems and techniques can also detect when the human tissue is removed and is no longer present near the UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method performed by a user equipment to detect a proximity of human tissue, the method comprising: determining a mutual coupling signal associated with a transmit antenna and a receive antenna of the user equipment; determining a mutual coupling difference between the mutual coupling signal and a reference mutual coupling signal; determining a beat signal difference between a current beat signal and a previous beat signal; determining an amount of micro-motion that is present within a near field of the user equipment based at least in part on the beat signal difference; determining whether human tissue is present within the near field of the user equipment based on the mutual coupling difference and the amount of micro-motion; determining an amount of radio frequency exposure associated with the human tissue based on determining that the human tissue is present within the near field of the user equipment; and reducing the amount of radio frequency exposure associated with the human tissue based on determining that the amount of radio frequency exposure exceeds a maximum permissible exposure.

Clause 2. The method of clause 1, wherein the reference mutual coupling signal is determined when human tissue is absent from the near field of the user equipment.

Clause 3. The method of any of clauses 1 to 2, wherein the near field is at least 4 centimeters away from a nearest outer surface of the user equipment.

Clause 4. The method of any of clauses 1 to 3, wherein the maximum permissible exposure comprises 1 milliwatt per square centimeter.

Clause 5. The method of any of clauses 1 to 4, further comprising: determining that the human tissue is present in the near field based on determining that the amount of micro-motion that is present within the near field exceeds a threshold.

Clause 6. The method of any of clauses 1 to 5, further comprising: determining that the human tissue is absent in the near field based on determining that the amount of micro-motion that is present within the near field fails to exceed a threshold.

Clause 7. The method of any of clauses 1 to 6, wherein determining the amount of micro-motion that is present within the near field of the user equipment comprises: determining an amount of noise associated with the near field when the human tissue is absent; and determining a rise over noise based on the beat signal difference and the amount of noise.

Clause 8. The method of clause 7, further comprising: based on determining that the rise over noise is approximately 1, determining that the human tissue is absent in the near field.

Clause 9. The method of any of clauses 7 to 8, further comprising: based on determining that the rise over noise is greater than 1, determining that the human tissue is present in the near field.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a digital signal processor (DSP), an application specific integrated circuit (ASIC), a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disc (CD) ROM, optical disc, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment to detect a proximity of human tissue, the method comprising:
   determining a mutual coupling signal associated with a transmit antenna and a receive antenna of the user equipment;
   determining a mutual coupling difference between the mutual coupling signal and a reference mutual coupling signal;
   determining a beat signal difference between a current beat signal and a previous beat signal;
   determining an amount of micro-motion that is present within a near field of the user equipment based at least in part on the beat signal difference;
   determining whether human tissue is present within the near field of the user equipment based on the mutual coupling difference and the amount of micro-motion;

determining an amount of radio frequency exposure associated with the human tissue based on determining that the human tissue is present within the near field of the user equipment; and reducing the amount of radio frequency exposure associated with the human tissue based on determining that the amount of radio frequency exposure exceeds a maximum permissible exposure.

2. The method of claim 1, wherein the reference mutual coupling signal is determined when human tissue is absent from the near field of the user equipment.

3. The method of claim 1, wherein the near field is at least 4 centimeters away from a nearest outer surface of the user equipment.

4. The method of claim 1, wherein the maximum permissible exposure comprises 1 milliwatt per square centimeter.

5. The method of claim 1, further comprising:
determining that the human tissue is present in the near field based on determining that the amount of micro-motion that is present within the near field exceeds a threshold.

6. The method of claim 1, further comprising:
determining that the human tissue is absent in the near field based on determining that the amount of micro-motion that is present within the near field fails to exceed a threshold.

7. The method of claim 1, wherein determining the amount of micro-motion that is present within the near field of the user equipment comprises:
determining an amount of noise associated with the near field when the human tissue is absent; and
determining a rise over noise based on the beat signal difference and the amount of noise.

8. The method of claim 7, further comprising:
based on determining that the rise over noise is approximately 1, determining that the human tissue is absent in the near field.

9. The method of claim 7, further comprising:
based on determining that the rise over noise is greater than 1, determining that the human tissue is present in the near field.

10. A user equipment comprising:
a memory;
at least one transceiver; and
at least one processor communicatively coupled to the memory and the at least one transceiver, the at least one processor configured to:
determine a mutual coupling signal associated with a transmit antenna and a receive antenna of the user equipment;
determine a mutual coupling difference between the mutual coupling signal and a reference mutual coupling signal;
determine a beat signal difference between a current beat signal and a previous beat signal;
determine an amount of micro-motion that is present within a near field of the user equipment based at least in part on the beat signal difference;
determine whether human tissue is present within the near field of the user equipment based on the mutual coupling difference and the amount of micro-motion;
determine an amount of radio frequency exposure associated with the human tissue based on determining that the human tissue is present within the near field of the user equipment; and
reduce the amount of radio frequency exposure associated with the human tissue based on determining that the amount of radio frequency exposure exceeds a maximum permissible exposure.

11. The user equipment of claim 10, wherein the reference mutual coupling signal is determined when human tissue is absent from the near field of the user equipment.

12. The user equipment of claim 10, wherein the near field is at least 4 centimeters away from a nearest outer surface of the user equipment.

13. The user equipment of claim 10, wherein the maximum permissible exposure comprises 1 milliwatt per square centimeter.

14. The user equipment of claim 10, wherein the at least one processor is further configured to:
determine that the human tissue is present in the near field based on determining that the amount of micro-motion that is present within the near field exceeds a threshold.

15. The user equipment of claim 10, wherein the at least one processor is further configured to:
determine that the human tissue is absent in the near field based on determining that the amount of micro-motion that is present within the near field fails to exceed a threshold.

16. The user equipment of claim 10, wherein the at least one processor is further configured to:
determine an amount of noise associated with the near field when the human tissue is absent; and
determine a rise over noise based on the beat signal difference and the amount of noise.

17. The user equipment of claim 16, wherein the at least one processor is further configured to:
determine that the human tissue is absent in the near field based on determining that the rise over noise is approximately 1.

18. The user equipment of claim 16, wherein the at least one processor is further configured to:
determine that the human tissue is present in the near field based on determining that the rise over noise is greater than 1.

19. An apparatus comprising:
means for determining a mutual coupling signal associated with a transmit antenna and a receive antenna of the apparatus;
means for determining a mutual coupling difference between the mutual coupling signal and a reference mutual coupling signal;
means for determining a beat signal difference between a current beat signal and a previous beat signal;
means for determining an amount of micro-motion that is present within a near field of the apparatus based at least in part on the beat signal difference;
means for determining whether a human tissue is present within the near field of the apparatus based on the mutual coupling difference and the amount of micro-motion;
means for determining an amount of radio frequency exposure associated with the human tissue based on determining that the human tissue is present within the near field of the apparatus; and
means for reducing the amount of radio frequency exposure associated with the human tissue based on determining that the amount of radio frequency exposure exceeds a maximum permissible exposure.

20. The apparatus of claim 19, wherein the reference mutual coupling signal is determined when human tissue is absent from the near field of the apparatus.

21. The apparatus of claim 19, wherein the near field is at least 4 centimeters away from a nearest outer surface of the apparatus.

22. The apparatus of claim 19, wherein the maximum permissible exposure comprises 1 milliwatt per square centimeter.

23. The apparatus of claim 22, further comprising:
means for determining that the human tissue is present in the near field based on determining that the amount of micro-motion that is present within the near field exceeds a threshold.

24. The apparatus of claim 19, further comprising:
means for determining that the human tissue is absent in the near field based on determining that the amount of micro-motion that is present within the near field fails to exceed a threshold.

25. The apparatus of claim 19, wherein determining the amount of micro-motion that is present within the near field of the apparatus comprises:
means for determining an amount of noise associated with the near field when the human tissue is absent; and
means for determining a rise over noise based on the beat signal difference and the amount of noise.

26. The apparatus of claim 25, further comprising:
means for determining that the human tissue is absent in the near field based on determining that the rise over noise is approximately 1.

27. The apparatus of claim 25, further comprising:
means for determining that the human tissue is present in the near field based on determining that the rise over noise is greater than 1.

28. A non-transitory computer-readable storage medium to store instructions executable by one or more processors to:
determine a mutual coupling signal associated with a transmit antenna and a receive antenna of a user equipment;
determine a mutual coupling difference between the mutual coupling signal and a reference mutual coupling signal;
determine a beat signal difference between a current beat signal and a previous beat signal;
determine an amount of micro-motion that is present within a near field of the user equipment based at least in part on the beat signal difference;
determine whether human tissue is present within the near field of the user equipment based on the mutual coupling difference and the amount of micro-motion;
determine an amount of radio frequency exposure associated with the human tissue based on determining that the human tissue is present within the near field of the user equipment; and
reduce the amount of radio frequency exposure associated with the human tissue based on determining that the amount of radio frequency exposure exceeds a maximum permissible exposure.

29. The non-transitory computer-readable storage medium of claim 28, wherein the instructions are further executable by the one or more processors to:
determine that the human tissue is present in the near field based on determining that the amount of micro-motion that is present within the near field exceeds a threshold.

30. The non-transitory computer-readable storage medium of claim 28, wherein the instructions are further executable by the one or more processors to:
determine an amount of noise associated with the near field when the human tissue is absent; and
determine a rise over noise based on the beat signal difference and the amount of noise.

* * * * *